United States Patent [19]

Inai et al.

[11] 4,437,111
[45] Mar. 13, 1984

[54] COLOR TELEVISION CAMERA

[75] Inventors: Takayoshi Inai, Takamatsu; Teruo Saitoh, Saijo; Hisayuki Sannomiya, Kagawa, all of Japan

[73] Assignee: Matsushita Electric Industrial Co., Ltd., Kadoma, Japan

[21] Appl. No.: 337,364

[22] Filed: Jan. 6, 1982

[30] Foreign Application Priority Data

Jan. 16, 1981 [JP] Japan ................................ 56-5264
Jan. 16, 1981 [JP] Japan ................................ 56-5265

[51] Int. Cl.³ ........................................... H04N 3/06
[52] U.S. Cl. ..................................... 358/44; 358/209; 358/211
[58] Field of Search ............... 358/211, 44, 41, 168, 358/209

[56] References Cited

U.S. PATENT DOCUMENTS 3,988,776 10/1976 Shinozaki ........................... 358/41
4,016,597 4/1977 Dillon ............................... 358/211
4,293,876 10/1981 Williams ........................... 358/211

FOREIGN PATENT DOCUMENTS 52-129233 6/1977 Japan .

Primary Examiner—Michael A. Masinick
Attorney, Agent, or Firm—Cushman, Darby & Cushman

[57] ABSTRACT

A color television camera comprises a color pickup device such as color pickup tube, an automatically detachable infrared cut filter disposed in the light path to an image receiving face of the pickup device, a brightness detection means which changes its output signal when brightness becomes under a certain predetermined level, a driving means for driving the automatically detachable infrared-cut filter to be removed from the light path to the image receiving face, and a video signal circuit including a switching circuit to operate in such a manner to switch the circuit to constitute a color video signal producing circuit when the brightness is over the predetermined level and accordingly the infrared-cut filter is inserted in front of the image receiving face, and on the other hand to switch the circuit to constitute a monochrome video signal producing circuit when the brightness is below the predetermined level and accordingly the infrared-cut filter is removed from the front of the image receiving face.

5 Claims, 7 Drawing Figures

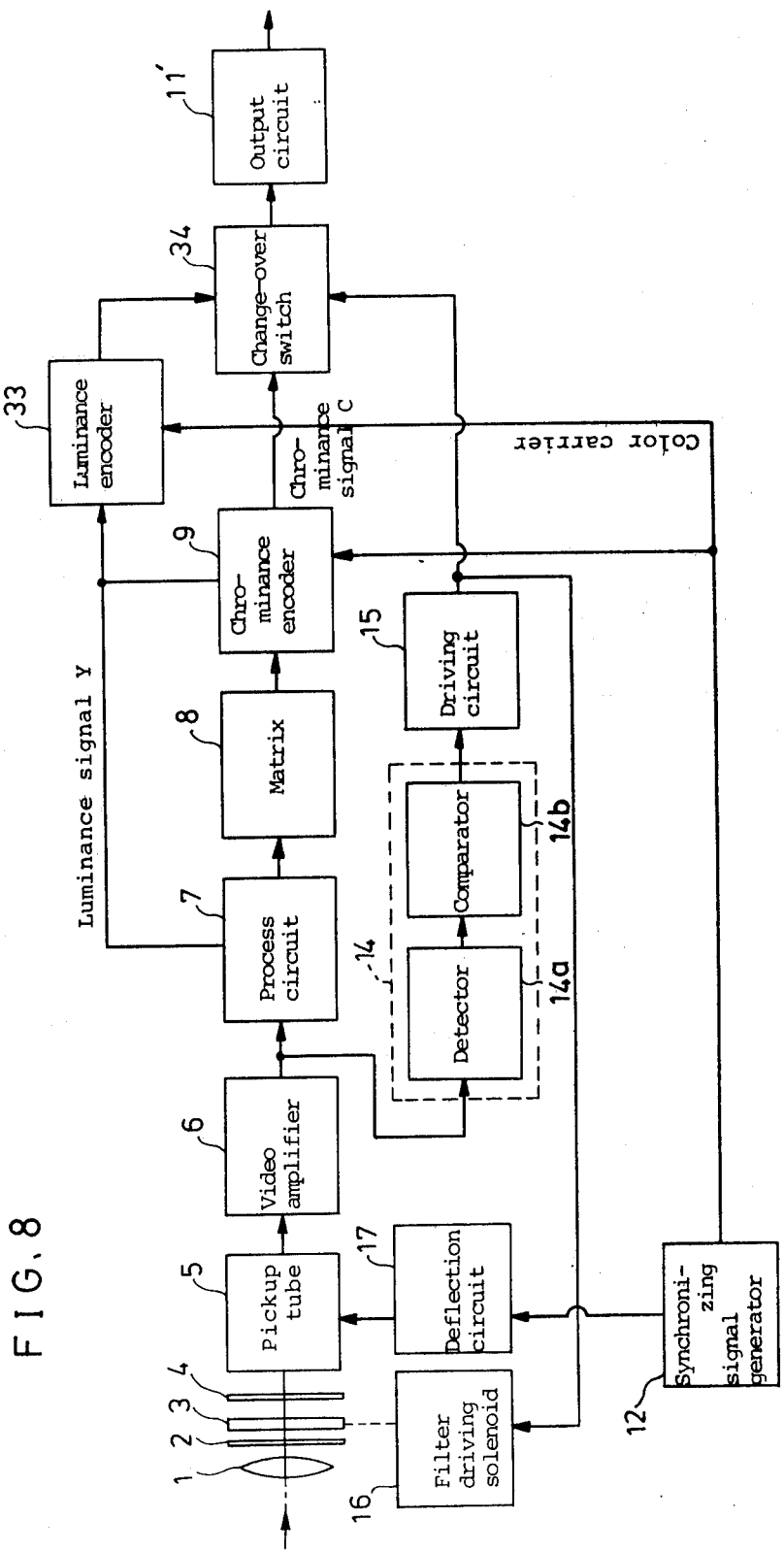

COLOR TELEVISION CAMERA

BACKGROUND OF THE INVENTION

1. Field of the Invention

The present invention relates to an improvement in a color television camera usable both for bright scenery as well as dark scenery.

2. Prior Art

Sensitivity spectrums of color pickup devices such as pickup tubes generally have characteristic curves "a", "b", "c" or "d" as shown in FIG. 1, and some of them, especially of recent high sensitivity type, have considerable sensitivities in the infrared range as shown by the curves "b", "c" and "d" of FIG. 1. When such devices having considerable sensitivities are used in a color television camera, the infrared sensitivities are usually cut off by utilization of an infrared cut filter in order for faithful color reproduction. For such purpose, an infrared cut filter of transmission characteristic of curve "e" or "f" of FIG. 2 is generally used disposed in front of the image receiving face. Though such use of an infrared cut filter results in improvement of the color reproduced, when the scenery becomes dark, it will decrease a pickup sensitivity of the image of the color television camera in comparison with the monochromatic television camera. In order to overcome such problem, a proposal has been made that a manually detachable infrared color filter is used in front of the color pickup device in order for performing an operation that the infrared filter is inserted when a color video signal is produced and the infrared filter is removed when a monochromatic video signal is produced, as disclosed in the Japanese unexamined patent publication Sho 52-129233 (129233/1977). However, such manually operated infrared filter is not practical for non-professional use, such as in visitor watching systems or in hobby video cameras wherein the operation should be as simple as possible in order to eliminate inadvertent maloperations leading to failures of image reproduction.

SUMMARY OF THE INVENTION

Accordingly, the present invention has as its object to provide an improved television camera usable both in bright scenery and dark scenery by automatic switching of its operation between color television camera and monochromatic television camera.

The color television camera in accordance with the present invention comprises a color pickup device, having sensitivity in the visible light range and at least a part of the infrared range, an automatically detachable infrared-cut filter disposed in a light path which is leading to said pickup device, a brightness detection means for detecting brightness change for issuing an output signal which varies between a first state when brightness is over a predetermined level and a second state when brightness is below the predetermined level, a filter driving means for driving the automatically detachable infrared-cut filter to be inserted into said light path leading to said pickup device at the first state and driving the same out of the light path at the second state, and a video signal circuit including a switching means to be switched in a manner to constitute a color video signal producing circuit at the first state and a monochrome video signal producing circuit at the second state.

DESCRIPTION OF THE PREFERRED EMBODIMENTS

Figure 1:
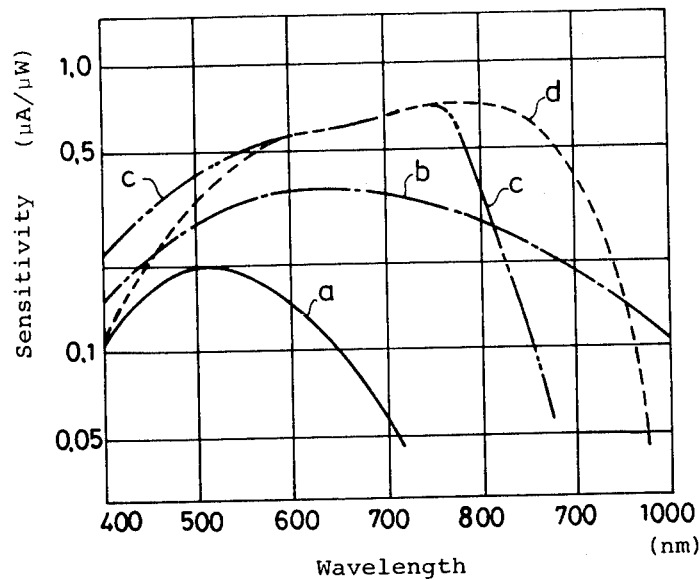
FIG. 1 is the graph of sensitivity spectrum curves of several pickup devices.
Figure 2:
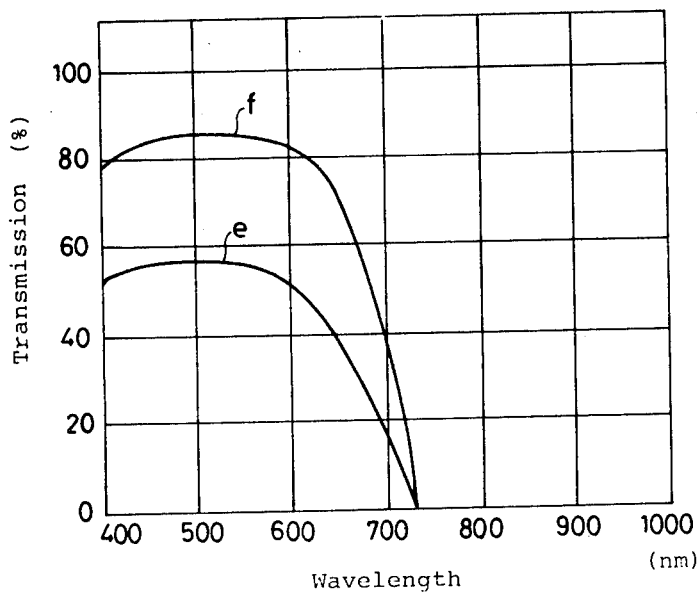
FIG. 2 is the graph of transmission spectrum curves of several infrared-cut filters.
Figure 3:
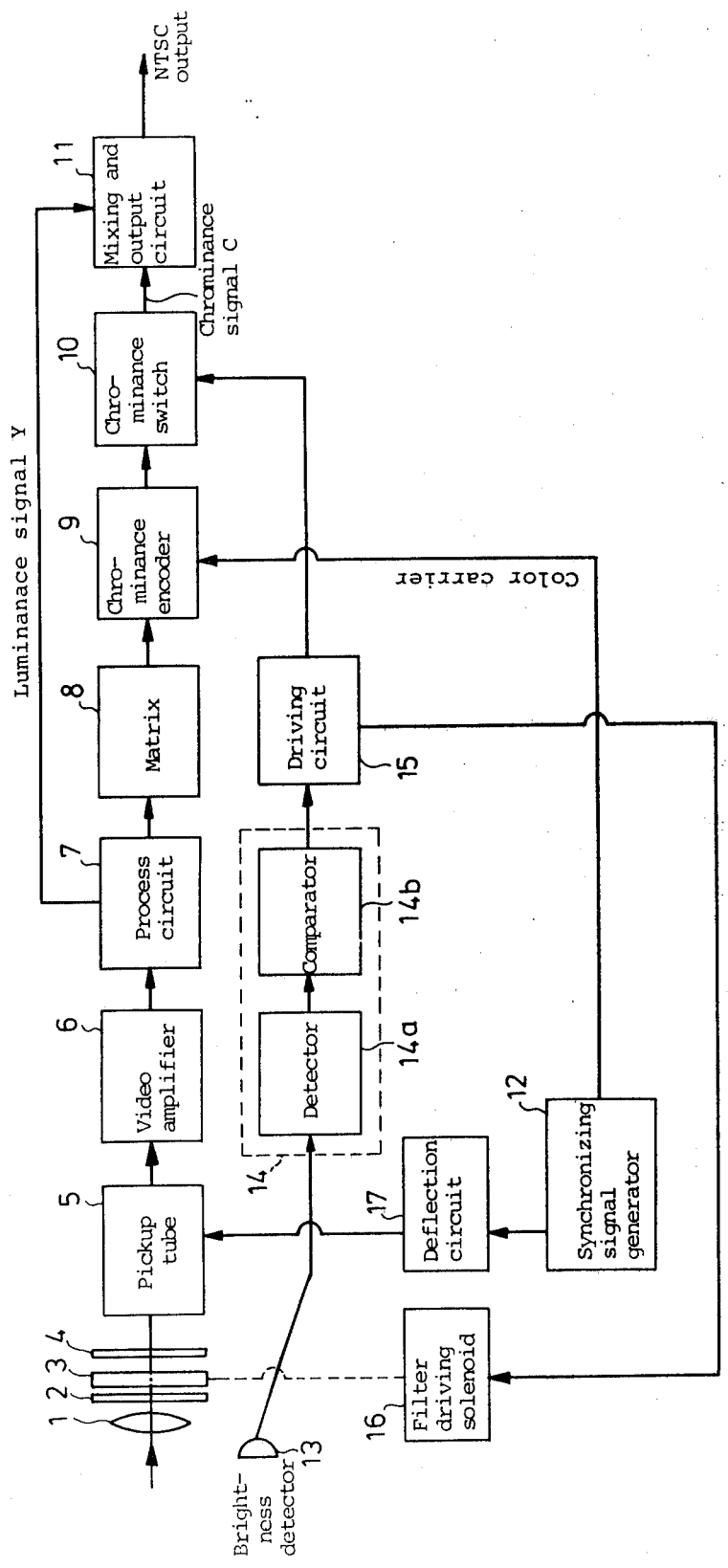
FIG. 3 is a circuit block diagram of a first example of a color television camera embodying the present invention.

1st EXAMPLE:

FIG. 3 is a block diagram of a first example embodying the present invention, wherein numerals 1, 2, 3 and 4 designate an objective lens, a color temperature compensation filter, a detachable infrared-cut filter and a quartz filter, respectively, disposed in front of an image receiving face of a pickup device, for example, a known pickup tube 5. Of course, the pickup device may be any other devices, such as a solid state imaging device utilizing LSI technology. The quartz filter 4 is for cutting off spectral components of a certain wavelength range. The pickup tube as such has a sensitivity extending to the infrared wavelength range, for example, as shown by the curve "d" of FIG. 1. The image receiving face of the pickup tube 5 has a known color filter having generally vertical color filter stripes for obtaining a spatially modulated chrominance signal. A video amplifier 6 receives and amplifies the output signal of the pickup tube 5, and gives output to a process circuit 7 which processes the chrominance signal. A matrix 8 receives an output from the process circuit 7 and gives a color differential signal to a chrominance encoder 9. The chrominance encoder 9 receives signals of color carrier and synchronizing signal from the synchronizing signal generator 12, as well as the color differential signal from the matrix circuit 8, and produces modulated chrominance signal C. The modulated chrominance signal C is, then led through a chrominance switch 10, and to a mixing and output circuit 11, wherein luminance signal Y from the process circuit 7 is mixed onto the chrominance signal C and produces output NTSC signal. The camera comprises a known photoelectric element or brightness detector 13 such as a photodiode, a photoconductor or a phototransistor for detecting brightness of scenery or substantially corresponding brightness thereto. A detector 14a of an operator circuit 14 receives and rectifies the signal from the brightness detector 13 and a comparator 14b compares the rectified output with a set voltage and issues an output to a driving circuit 15. Therefore, the driving circuit 15 issues an output, when the detected brightness is in a first state of exceeding a certain level, to the chrominance switch 10 and a filter driving solenoid 16. Then the chrominance switch 10 gates on, i.e., passes the chrominance signal C to the mixing and output circuit 11, and this is responding to the first state of brightness. On the contrary when the brightness is in a second state of below the above-mentioned certain level, the chrominance switch 10 gates off, i.e., stops the chrominance signal. Corresponding to the above-mentioned operations of the chrominance switch 10, the filter driving solenoid 16 is driven by the output signal from the driving circuit 15 in a manner that for the first state of brighter scenery the infrared-cut filter is inserted in the light path, and for the second state of less brighter scenery the infrared-cut filter is removed from the light path. A known deflection circuit 17 to produce signals for horizontal and vertical deflection means of the pickup tube 5 is synchronized by the signal from the synchronizing signal generator 12.

Figure 5:
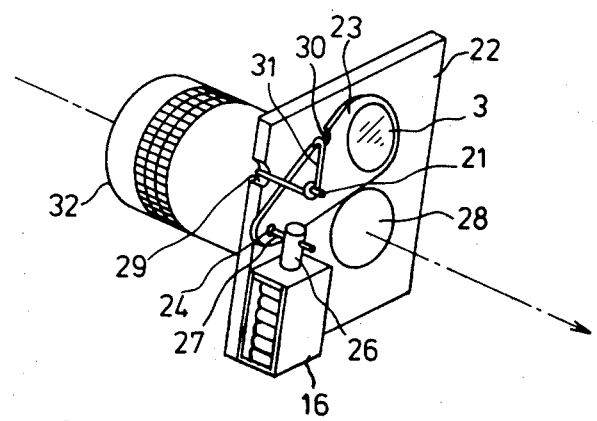
FIG. 5 is a perspective view of a part of the color television camera of the examples.
Figure 6:
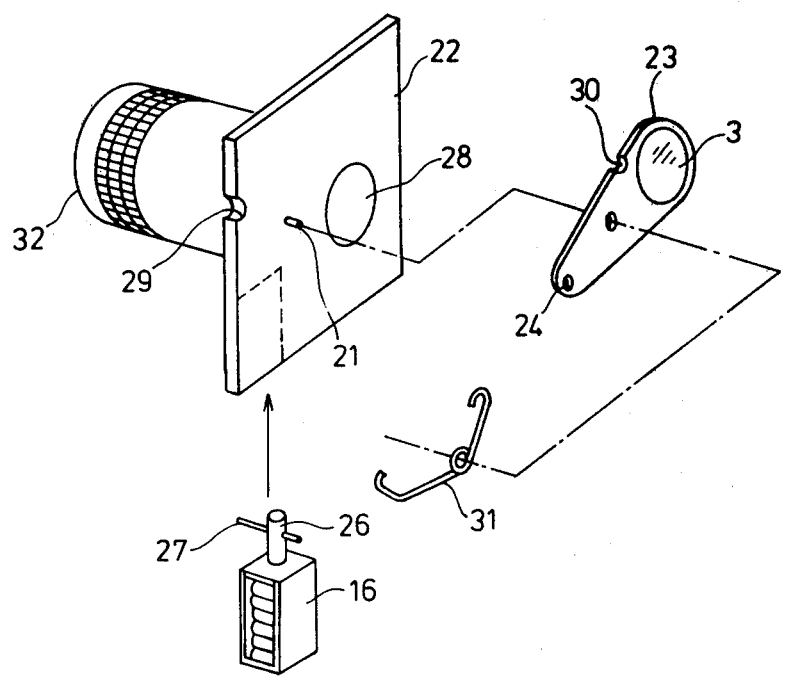
FIG. 6 is an exploded perspective view of the part of FIG. 5.

FIG. 5 and FIG. 6 show one practical example of the mechanical construction of the filter driving solenoid 16 and related parts thereto. In the example of FIGS. 5 and 6, a filter frame 22 holding the infrared-cut filter 3 is fulcrumed by a shaft pin 21, and the frame 22 is energized by a spring 31 hooked at both ends by recesses 29 and 30, so as to have a rest position where the infrared-cut filter 3 is inserted in the light path. A hole 24 at a driving end of the frame 22 is engaged to a pin 27 fixed at an end part of a plunger 26 of the filter driving solenoid 16. The shaft pin 21, a fixed end of the spring 31, the solenoid 16 and lens sleeve 32 are mounted on a main frame 22, and the resting position of the infrared-cut filter 3 is set to face the light path hole 28 of the main frame 22.

Figure 7:
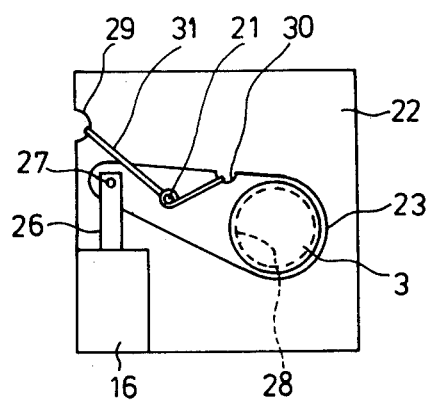
FIG. 7 is a front view of the part of FIGS. 5 and 6.

The operation of the apparatus of FIG. 3 is as follows:

(1) When the objective scenery is in a range of a brightness above the predetermined set level, for example 100 lux:

Then, it is found by the comparator 14b that the output of the detector 14a is higher than a preset level, and then, the comparator 14b issues an output to cause the driving circuit 15 to make the chrominance switch 10 ON and the filter driving solenoid 16 deenergized. Therefore, the filter frame 23 rests on the light path hole 28 of the main frame by means of the spring 31 as shown by FIG. 7, and therefore the infrared-cut filter 3 is inserted in the light path. Then, the objective image light taken by the objective lens 1 is led, through the color temperature compensation filter 2, the infrared-cut filter 3 and the quartz filter 4 to the pickup tube 5. The signal produced by the pickup tube 5 is then amplified by the video amplifier 6 and processed by the process circuit 7 and produces luminance signal Y given to the mixing and output circuit 11. On the other hand, the output chrominance signal of the process circuit 7 is further led through the matrix 8 and to chrominance encoder 9, wherein color difference signals are converted to chrominance signal C and led to chrominance switch 10. And further, after passing the chrominance switch 10, the chrominance signal C is given to the mixing and output circuit 11, where the luminance signal Y and the chrominance signal C are mixed to produce an NTSC video signal. That is, when the scenery brightness is above the predetermined level, the NTSC signal is produced based on the incident light which is treated by deleting infrared component undesirable for good color reproduction.

(2) When the objective scenery is in a range of a brightness below the predetermined level of 100 lux:

Then, it is found by the comparator 14b that the output of the detector 14a is lower than the preset level, and then the driving circuit 15 makes the chrominance switch 10 OFF and the filter driving solenoid 16 be energized. Therefore, the plunger 26 of the solenoid 16 is pulled down by the electromotive force, thereby pulling down the driving end of the filter frame 23. Accordingly, the infrared-cut filter 3 is lifted up and removed from the light path hole 28, as shown in FIG. 5. Then the objective image light taken by the objective lens 1 is led, through the color temperature compensation filter 2 and the quartz filter 4 to the pickup tube 5. That is, the light is led without passing the infrared-cut filter 3, and therefore the components of the long wavelength spectrum are retained thereby producing as high output as possible. The signal produced by the pickup tube 5 is then amplified by the video amplifier 6 and processed by the process circuit 7 and produces luminance signal Y given to the mixing and output circuit 11. In this case the output chrominance signal C produced based on the output of the process circuit is stopped by the chrominance switch circuit 10, since the driving circuit 15 gives the signal to cause the chrominance switch 10 to stop the chrominance signal C. Therefore the signal issued from the output terminal is a monochrome video signal but produced by utilizing light to the extent of infrared spectral component.

Figure 4:
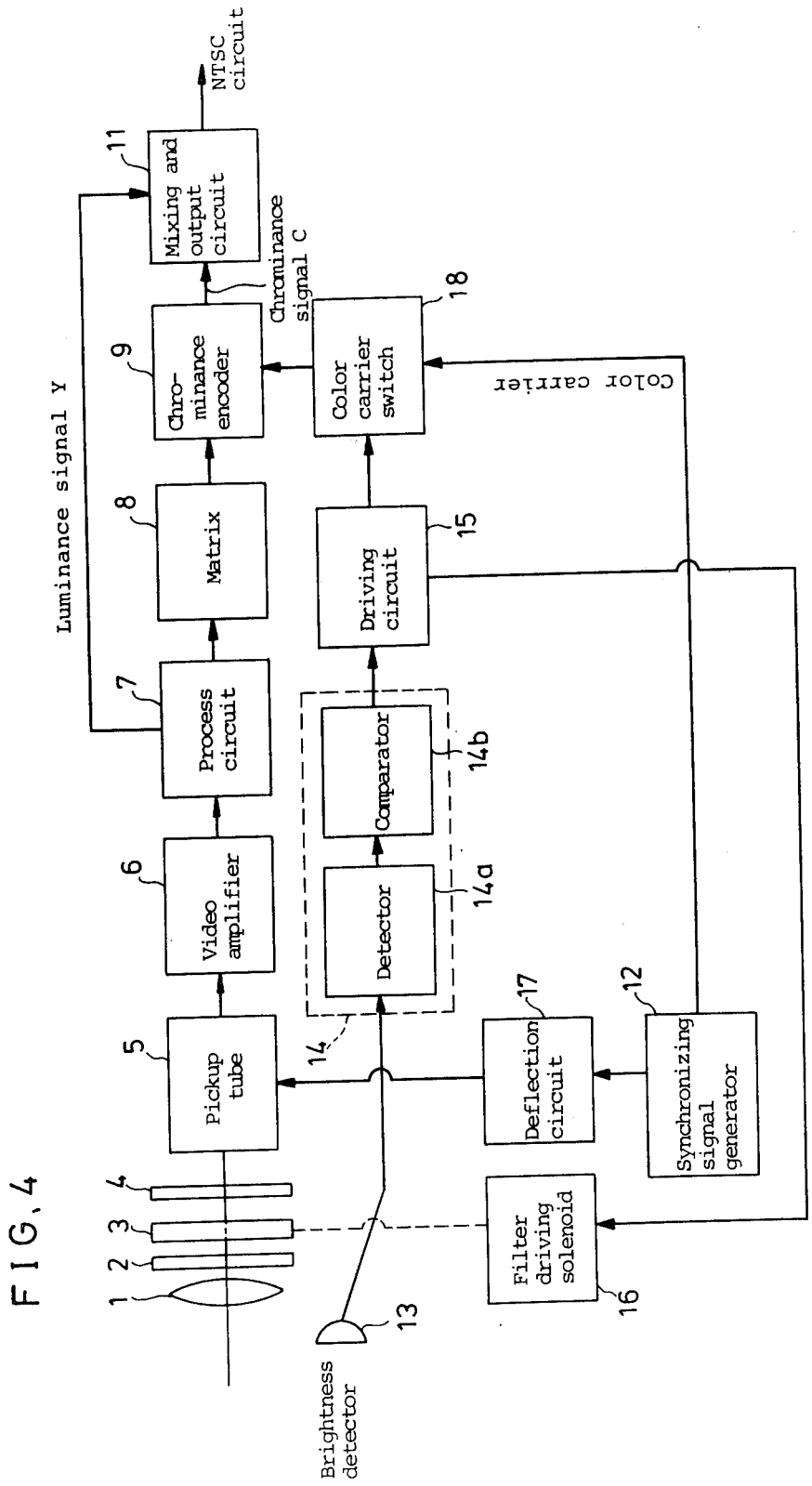
FIG. 4 is a circuit block diagram of a second example of a color television camera embodying the present invention.

2nd EXAMPLE:

FIG. 4 is a block diagram of a second example embodying the present invention, wherein most parts are similar to those of the example of FIG. 3, and the differences are mainly in the following two points. The first one is that the color carrier output signal from the synchronizing signal generator 12 is given to the chrominance encoder 9 through a color carrier switch 18, which is controlled by the output signal from the driving circuit 15. The second one is that the output of the chrominance encoder 9 is given directly to the mixing and output circuit 11, instead of passing through such chrominance switch 10 like in FIG. 3.

The operation of the apparatus of FIG. 4 is as follows:

(1) When the objective scenery is in the range of a brightness above the set level, for example 100 lux, then the driving circuit 15 gives such output signal to the color carrier switch 18 as to make it pass the color carrier therethrough to the chrominance encoder 9, thus enabling the latter to produce modulated chrominance signal and to give it to the mixing and output circuit 11, which thereby produces NTSC color video signal. Of course in this case, the filter driving solenoid 16 is deenergized allowing to insert the infrared filter 3 in the light path, thereby resulting in production of NTSC signal of good color performance.

(2) When the objective scenery is in the range of a brightness below the set level, then the driving circuit 15 gives such output signal to the color carrier switch as to make it stop the color carrier thereby thus disabling the chrominance encoder 9 to produce modulated chrominance signal. Therefore, the output signal of the mixing and output circuit 11 produces a monochromatic video signal, which is based on a higher level of incident light taken without application of the infrared-cut filter 3, which has been removed from the light path by means of energization of the filter driving solenoid 16 based on the output signal of the driving circuit 15.

In both examples of FIG. 3 and FIG. 4, the operation circuit 14 preferably comprises a delay means or a time constant and hysteresis means (not shown as a block but is built in) for attaining moderate operation by controlling the signal between the brightness detector 13 and operation of the driving circuit 15. This measure is preferable in order to prevent unnecessary or undesirable frequent repetitions of the filter driving solenoid 16 accompanied by mechanical nosies when the brightness is drifting at the critical level by for example swinging of tree leaves shading the scenery, or the like. The predetermined brightness level, at which the operation is switched between the color video camera or monochrome video camera, can be of course adjusted by means of, for example, adjusting the reference voltage for the comparator 14*b*.

MODIFIED EXAMPLE:

As modified examples, the chrominance switch 10 of FIG. 3 or the color carrier switch 18 of FIG. 4 may be omitted, but retaining detachably disposed infrared-cut filter 3 and its driving network from the brightness detector 13, the operation circuit 14, the driving circuit 15 and the filter driving solenoid 16. In this case, since the video signal is always of the color video signal without selectively removing the chrominance signal, the reproduced image becomes reddish when the infrared-cut filter 3 is removed for operation in the darker state. But such usage is acceptable for some use, for example, for night watching purposes or the like.

The above-mentioned examples of the present invention is applicable or modifiable to color television cameras of three pickup tube type without substantial or material change.

What is claimed is:

1. A color television camera comprising:
   a pickup device having sensitivity in the visible light range and at least a part of the infrared range,
   an automatically detachable infrared-cut filter means disposed in a light path which is leading to said pickup device,
   a brightness detection means disposed nearer to an object than said infrared-cut filter so as to detect brightness change of the light coming into said light path for issuing an output signal which varies between a first state when brightness is over a predetermined level and a second state when brightness is below the predetermined level,
   a driving circuit part including a detector for detecting the output signal of said brightness detection means and a comparator for comparing a detected output signal of said detector with a predetermined level, and a driving circuit part for issuing a control signal responding to the result of the comparing by the comparator,
   filter driving means coupled to said driving circuit and controlled based on said control signal for driving said automatically detachable infrared-cut filter to be inserted into said light path leading to said pickup device at said first state and driving the same out of said light path at said second state, and
   a video signal circuit coupled to said driving circuit and controlled based on said control signal including a switching means to be switched in a manner to constitute a color video signal producing circuit at said first state and a monochrome video signal producing circuit at said second state.

2. A color television camera in accordance with claim 1, wherein said brightness detection means is a photoelectric element selected from a group consisting of photocell and photoconductive element which is provided separately from said pickup device.

3. A color television camera in accordance with claim 1 or 2, wherein said video signal circuit includes
   a first circuit for producing a chrominance signal,
   a second circuit for producing a luminance signal, and
   a change-over switch for switching selectively to lead either of output of said first circuit or output of said second circuit.

4. A color television camera in accordance with claim 1 or 2, wherein said video signal circuit includes
   a chrominance encoder for producing a modulated chrominance signal based on color signals obtained from said pickup device,
   a chrominance switch for selectively stopping or passing said modulated chrominance signal from said chrominance encoder, and
   a mixing and output circuit for composing a television signal from output signal of said chrominance switch and luminance signal.

5. A color television camera in accordance with claim 1 or 2, wherein said video signal circuit includes
   a chrominance encoder for producing a modulated chrominance signal based on color signals obtained from said pickup device,
   a color carrier switch for selectively gating transmission of color carrier to said chrominance encoder, and
   a mixing and output circuit for composing a television signal from output signal of said chrominance encoder and luminance signal.

* * * * *